(12) United States Patent
Uttrachi

(10) Patent No.: US 7,462,799 B2
(45) Date of Patent: Dec. 9, 2008

(54) WELDING SHIELDING GAS FLOW RATE-LIMITING APPARATUS

(76) Inventor: Gerald Daniel Uttrachi, 4313 Byrnes Blvd., Florence, SC (US) 29506-8310

( * ) Notice: Subject to any disclaimer, the term of this patent is extended or adjusted under 35 U.S.C. 154(b) by 583 days.

(21) Appl. No.: 11/333,733

(22) Filed: Jan. 17, 2006

(65) Prior Publication Data
US 2007/0164000 A1 Jul. 19, 2007

(51) Int. Cl.
B23K 9/16 (2006.01)
(52) U.S. Cl. ............................................. 219/74
(58) Field of Classification Search ............. 219/74, 219/136, 137.9; 138/46
See application file for complete search history.

(56) References Cited

U.S. PATENT DOCUMENTS

| | | | |
|---|---|---|---|
| 6,390,134 B1 | 5/2002 | Hanby | |
| 6,610,957 B2 * | 8/2003 | Uttrachi | 219/74 |
| 7,015,412 B1 * | 3/2006 | Uttrachi | 219/74 |
| 7,019,248 B1 * | 3/2006 | Uttrachi | 219/74 |

OTHER PUBLICATIONS

Standifer;Shielding Gas Consumption Efficency; The Fabricator; Jun. 2000; p. 27,col. 2&3 & p. 28 col. 3; vol. 30, # 6;Croydon Group, Rockford,IL.

Weber; How to save 20% on weld costs;Trailer Body Builders; Jan. 2003; p. 46 col. 3; vol. 44, #3; PRIMEDIA, NY, NY.

Instructions on use of Hanby patent device from Internet site; http://www.surgeandsave.com printed on Jan. 6, 2006.

Product description of Flow Limiting Knob from Internet site: http://www.smitheqipment.com/ products/regul/flowmeters.htm printed on Jan. 6, 2006.

* cited by examiner

Primary Examiner—Kevin P Kerns

(57) ABSTRACT

Welding shielding gas is often wasted because the welding operator sets flow rates excessively high. The flow rate limiting apparatus described can be added externally to a needle valve flow control adjustment knob in a flow control device. It is connected such that it limits the degree of allowable movement of the flow control knob. It can be locked with a key type tool to prevent changes. Even when the maximum flow is set and locked, the flow can still be lowered by the operator from the maximum allowable flow setting. This ability allows the operator to adjust flow for differing needs and may further decrease gas usage. Eliminating the ability to set excessively high flow rates also prevents the creation of turbulent flow exiting the shielding gas nozzle or cup thereby eliminating air entrainment into the shielding gas stream improving weld quality.

5 Claims, 6 Drawing Sheets

WELDING SHIELDING GAS FLOW RATE-LIMITING APPARATUS

BACKGROUND

1. Field of Invention

This apparatus allows limits to be set for the adjustment range of a flow rate control knob on a welding shielding gas control device to reduce gas waste and prevent entrained air in the shielding gas stream caused by excessive flow rates.

2. Background

Gas metal arc welding (GMAW) is the official American Welding Society designation for one of the most common welding processes. It is often called MIG welding or wire welding. GMAW will be used in this text. Gas tungsten arc welding (GTAW) is the official American Welding Society designation for a commonly used welding process. It is often called TIG welding. GTAW will be used in this text. In the GMAW process, molten metal is produced by an electric arc. A welding wire is fed into the arc zone by a feeding mechanism, through what is referred to as a welding torch. A suitable power source is connected between the workpiece to be welded and the welding wire passing through the welding torch producing the arc. Molten metal comprising the weld is derived from the materials to be welded and the welding wire being fed though the welding torch. In the GTAW process, molten metal is also produced by an electric arc. An essentially non-consumable tungsten electrode is located in what is referred to as a welding torch that is held in close proximity to the workpiece to be welded. A suitable power source is connected between the workpiece and the tungsten electrode in the welding torch producing the arc. In GTAW molten metal comprising the weld is derived from the materials to be welded and additionally in some applications from a welding rod feed into the molten weld puddle.

Both GMAW and GTAW processes utilize a shielding gas to protect the molten weld metal from the surrounding air. Oxygen, nitrogen as well as hydrogen from the moisture in the air cause significant problems in weld metal. This shielding gas may be argon, carbon dioxide, helium or mixtures of these and small amounts of other gases. This shielding gas is usually transported in a flexible hose to and through the welding torch. It exits the welding torch in a tubular device surrounding the wire or tungsten electrode. In GMAW this device is often made of a copper alloy and is called a nozzle. In the GTAW process the shielding gas exits most often through a ceramic cylindrical device referred to as a gas cup. The shielding gas is usually supplied from a high-pressure gas cylinder or a pipeline. The welding operator is often required to set the shielding gas flow rate utilizing a shielding gas flow control mechanism. One type of such mechanism employs a needle valve for gas flow adjustment. The flow rate required is dependent on a number of variables including the specific gas mixture but generally ranges from a low of approximately 5 liters per minute (10.6 cubic feet per hour) for GTAW to a high of about 24 liters per minute (51 cubic feet per hour) for GMAW. When helium gas mixtures are used the flow rates may be considerably higher than those mentioned. Because of the significantly different flows required, needle valve controls must have a wide range of operation. These needle valve devices are often designed to handle a variety of gases and if on a pipeline gas supply the various pipeline pressures that might be encountered. Therefore particularly with gases of higher density, such as argon or argon rich mixtures, they often allow much higher flow rates than are desirable. This enables the welding operator to set flow rates much higher than needed.

If the flow rates are set at too low a level there will be insufficient gas available to adequately shield the molten weld puddle. Certain welding joint designs such as when joining two perpendicular plates (referred to as a fillet weld) allow the use of lower gas flow rates since the members being welded help contain the shielding gas. Therefore it is desirable to allow the welding operator the ability to have some control of the shielding gas flow so they can adjust flow levels to fit the particular welding applications.

The maximum desirable gas flow rate is dependent on a number of variables including the diameter of the shielding nozzle or cup and the specific torch design. For example, if the flow rate in a GMAW torch utilizing argon, carbon dioxide or mixtures of these gases exceeds about 28 liters per minute (60 cubic feet per hour) the exiting, gas flow will be turbulent versus the desired laminar flow. Turbulent flow causes air to be entrained into the shielding gas stream. The weld quality will be degraded due to the molten weld metal absorbing oxygen or nitrogen from the air. When welding steel, moisture from the air will break down into hydrogen that is readily absorbed in molten steel. As the weld puddle cools the presence of hydrogen may cause small holes referred to as porosity or cracks. Nitrogen may also cause porosity and when welding steel it forms very hard metallurgical constituents making the steel brittle. Excess oxygen can cause a number of problems with a common one being porosity when it combines with the carbon in the steel forming carbon monoxide gas holes.

The use of excessive flow rates wastes significant shielding gas. Unfortunately welding operators often follow the adage that "if some shielding gas is good more must be better." It has been observed that many welders are utilizing twice the amount of shielding gas flow they should. An article in the June, 2000 Fabricator Magazine entitled "Shielding Gas Consumption Efficiency," page 27, col. 2 & 3 sites the fact that most shops are using from about two to over ten times more gas than is possible. In the same article page 28, col. 3, third paragraph states; "some welders think that if a little bit is good, then a lot is even better." This reinforces the lack of understanding of the quality problems associated with high gas flow in addition to indifference about using excess shielding gas. An article was published in the January, 2003 issue of Trailer Body Builders Magazine entitled "How to Save 20% on Welding Costs." On page 46, col. 3 of this article a representative from a leading manufacturer of shielding gases is quoted as saying, "A minimum of 142 liters (5 cubic feet) of gas is required to weld 0.45 kilograms (one pound) of wire, but the industry average usage is 850 liters (30 cubic feet)." Since it is very unusual to need more than about 225 to 280 liter (8 to 10 cubic feet) of shielding gas per 0.45 kilograms (one pound) of wire this statement means the average user consumes from three to six times the amount of shielding gas theoretically needed. In the article the representative from the manufacturer of welding gases on page 46, col. 3 states from his observation "welders typically use an excessive amount of shielding gas, thinking "if a little is good more must be better."" This reinforces that welders setting excessively high shielding gas flow rates is a significant cause of gas waste. Using the lower mentioned value of 3 times theoretical need for the average usage and estimating the average retail price and annual volume;

American consumers are wasting over 750 million to one billion dollars annually in shielding gas employed for GMAW and GTAW.

3. Description of Prior Art

There are several devices employed which limit the flow of shielding gas flow when using a needle valve type flow control mechanism:

(a) One method occasionally used to limit the maximum shielding gas flow rate is to incorporate a flow-control orifice at the output port of a flow control mechanism or close to the solenoid used to turn the gas flow off and on. Hanby in U.S. Pat. No. 6,390,134, issued on May 21, 2002, defines the use of restrictors to control shielding gas flow. Hanby states in col. 2, 7 to col. 2, 9, "Gas-flow may be set to any level below the maximum threshold by adjusting the flowmeter, just as in normal welding operation." Instructions for the use of a product listed as produced utilizing this patent were presented on Internet web site http://www.surgeandsave.com on Jan. 6, 2006. These instructions describe a complicated procedure for selecting the proper orifice size. It is not clear if the orifice is being sized to control the steady state flow or if only the surge flow due to pressure build-up in the gas delivery hose is being addressed with this device. The method of controlling the maximum flow in either situation requires trial and error and is not readily usable for the average production-welding situation. Controlling flow with an orifice that is mechanically added external to the flow control or at the end of the gas delivery hose creates other problems. Orifice type devices are not practical when several types of shielding gas or gas mixtures with significantly different densities are utilized. For example, when using GTAW and welding steel, an argon shielding gas would mostly likely be employed but when welding aluminum a much less dense helium gas mixture might be used. The large differences in gas densities would require significantly different gas flow rates and therefore different orifice sizes to produce these flow rates.

(b) Another method employed by one manufacturer of needle valve shielding gas flow controls provides a locking flow control knob that replaces the knob supplied with the flowmeter/flow-control mechanism. A description of this device is referenced from material presented on the manufacturer's Internet Web site http:www.smithequipment.com/products/regul/flowmeters.htm on Jan. 6, 2006. The device simply locks the knob from turning. This requires mechanically disassembling the flow control mechanism, which some users are reluctant to perform. In addition, fully locking the flow setting may not be desirable. This does not allow adjustment by the welding operator to increase flow when necessary such as when drafts are present. Also this device is only applicable to this manufacturer's products and can not be used on the majority of flow control devices that exist and are not of this specific design. The vast majority of needle valve type flow control mechanisms that are in use in the welding industry do not have a means of controlling flow limits.

SUMMARY, OBJECTS AND ADVANTAGES

The principle object of this welding shielding gas flow rate-limiting apparatus is to provide flow control limits on the tens of thousands of existing needle valve type flow control mechanisms currently in use in US industry as well as on new flow-control mechanisms. This flow rate-limiting apparatus has the ability to be adjusted to allow the maximum desirable flow rate which the welding operator can set as well as lower levels more appropriate to the specific needs of a particular fabrication. This allows the welding operator to adjust flows to lower levels when desired, such as for fillet welds or when drafts are not a problem. The apparatus incorporates the capability of adding a security-locking mechanism. This security locking mechanism would require a key type tool or a coded locking system to be removed. The apparatus may also include a device to increase the force needed to turn the control knob so it is not inadvertently moved due to the weight of the flow rate-limiting apparatus being attached.

DRAWING FIGURES

FIG. 1 schematically illustrates an external view of a portion of a shielding gas flow-control mechanism showing a flow-control knob.

FIG. 2 illustrates a flow rate-limiting device that can be attached to the flow-control knob.

FIG. 3 schematically illustrates the flow rate-limiting device attached to the flow-control knob.

DESCRIPTION—MAIN EMBODIMENT

Figure 1:
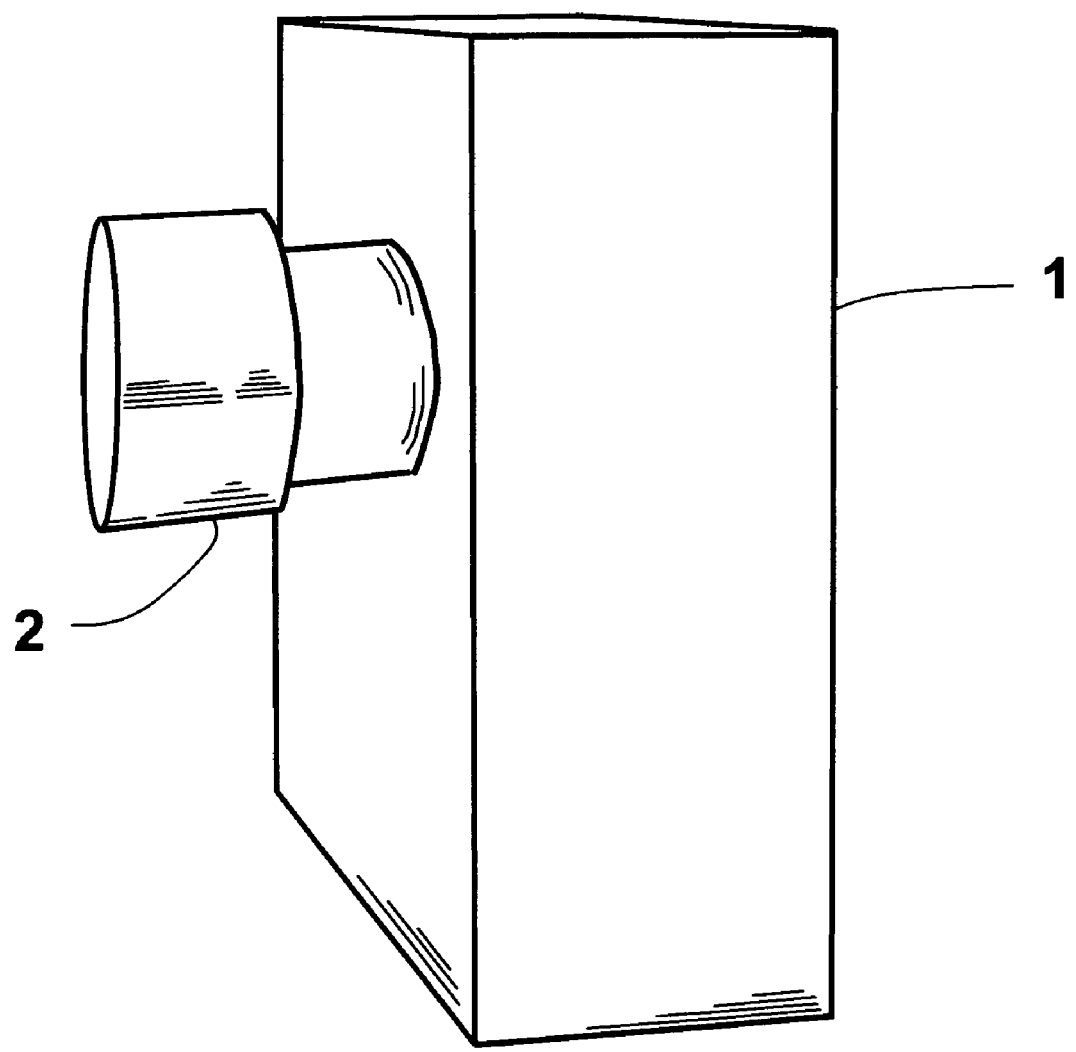

FIG. 1 illustrates a portion of a flow-control mechanism 1 with a flow-control adjustment knob 2. Flow-control mechanism 1 also contains input and output gas ports (not shown) in various configurations. The device may also include a rotameter flow gauge (not shown) and external piping (not shown).

Figure 2:
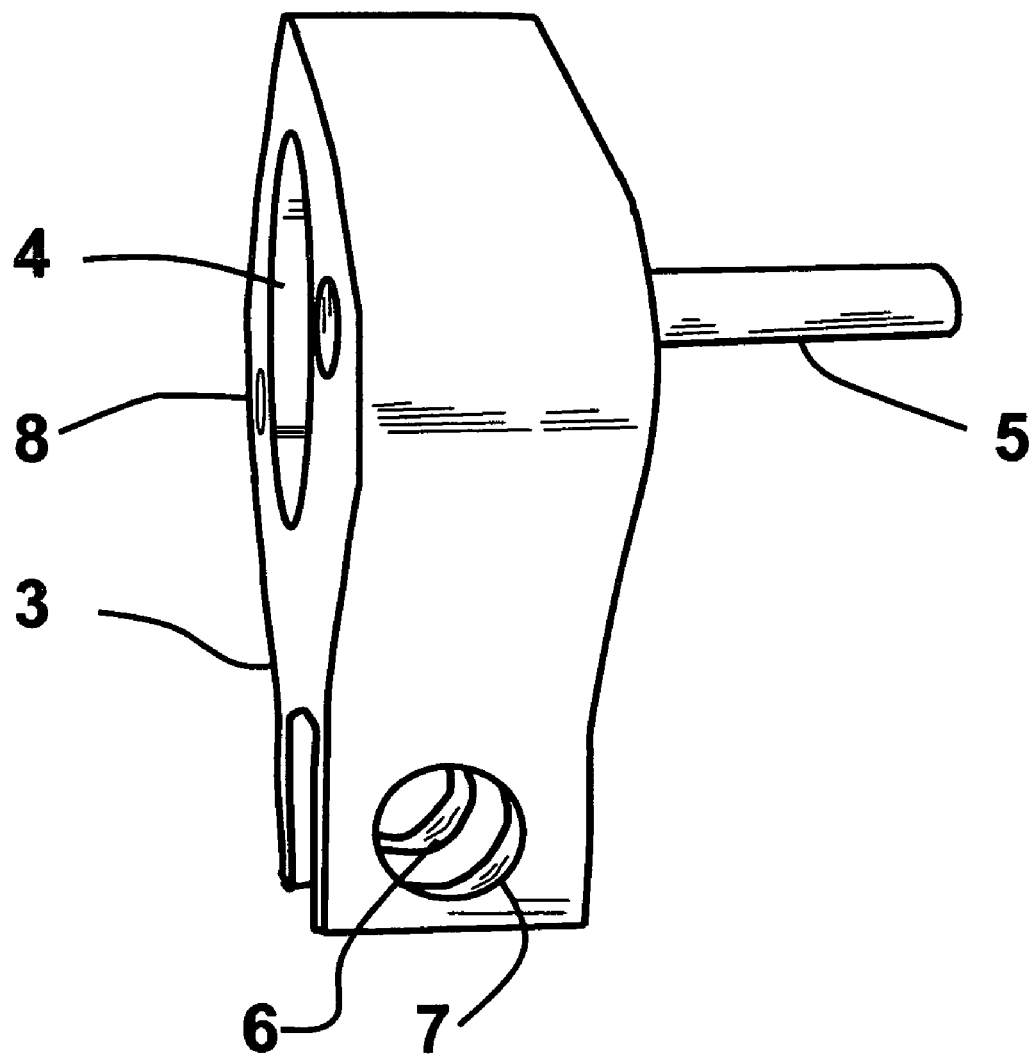
Figure 5:
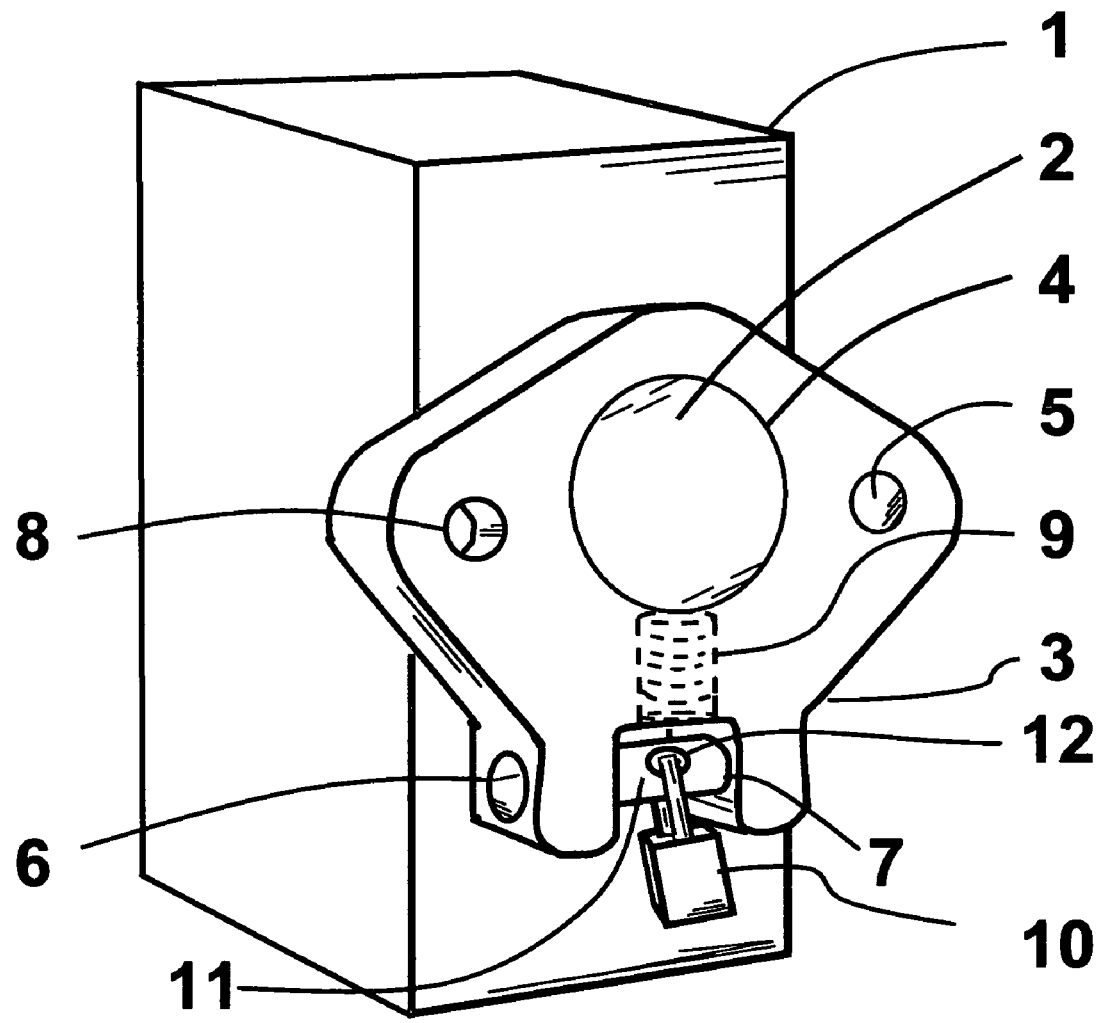
FIG. 5 illustrates the addition to the apparatus of a security-locking device that blocks access to the fastener that connects the flow rate-limiting device on to the flow-control knob.

FIG. 2 illustrates a flow rate-limiting knob attachment 3. Hole 4 is sized such that it can fit over flow-control adjustment knob 2 (FIG. 1). A mechanical protrusion 5 (FIG. 2) is used to contact the flow-control mechanism 1 body (FIG. 1) or part attached to flow-control mechanism 1 limiting the amount flow-control knob 2 can be turned. Also illustrated are two blocking holes 6 and 7 which provide a means of blocking access to set screw 9 (FIG. 5). An optional hole 8 is shown in flow rate-limiting knob attachment 3; a plurality of such holes may be used to allow assembly of mechanical protrusion 5 in various predetermined locations for adaptation to various flow-control models and to allow different degrees through which flow-control knob 2 can be turned. The predetermined distance mechanical protrusion 5 is placed in flow rate-limiting knob attachment 3 defines the amount that flow-control knob 2 can turned before contacting the flow-control mechanism 1 body (FIG. 1) or part attached to the flow-control mechanism 1. By increasing this predetermined distance the amount the flow-control knob 2 can be turned will increase, therefore increasing the range of allowable flow adjustment.

Figure 3:
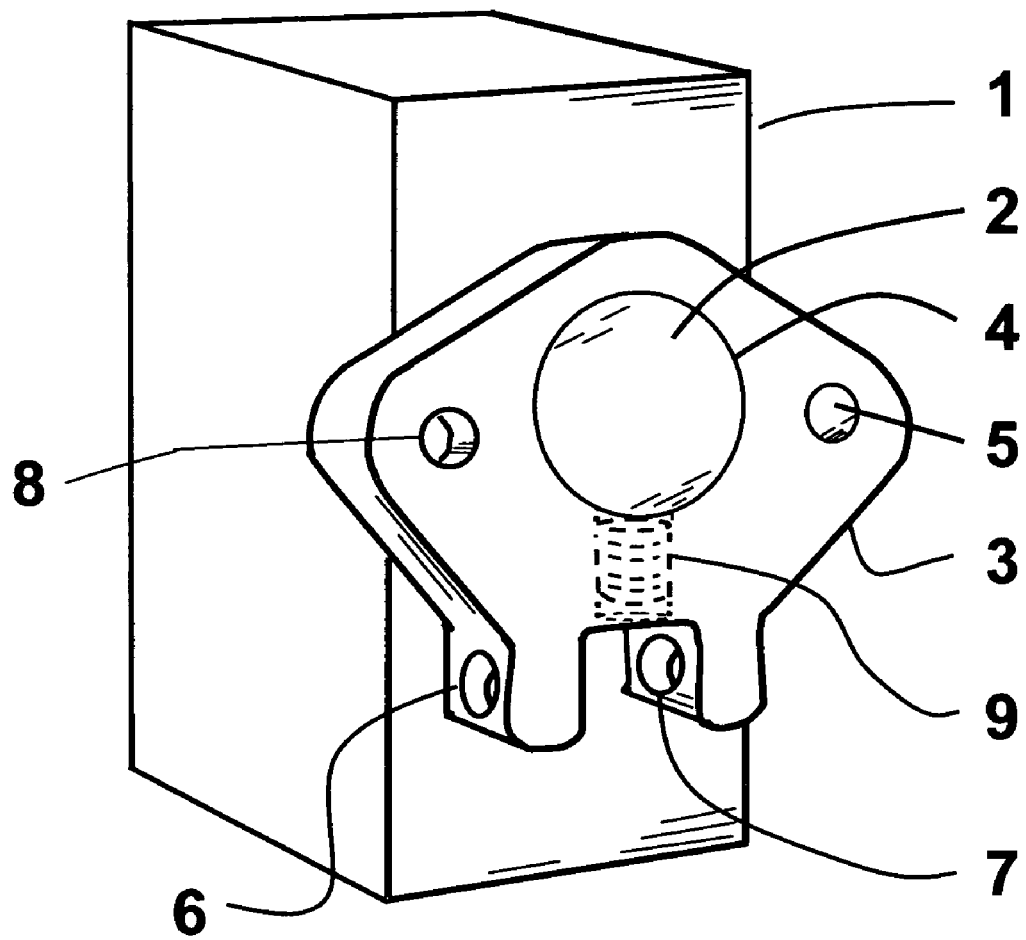

FIG. 3 illustrates a flow-control mechanism 1 with flow-control adjustment knob 2 attached to a flow rate-limiting knob attachment 3. A possible means of connecting flow rate-limiting knob attachment 3 to flow-control adjustment knob 2 is a set screw 9. Mechanical protrusion 5 contacts flow-control mechanism 1 body or part attached to flow-control mechanism 1 to limit the amount flow-control knob 2 can be turned. Also illustrated are two blocking holes 6 and 7 which provide a means, as show in FIG. 5, of blocking access to set screw 9.

Figure 4:
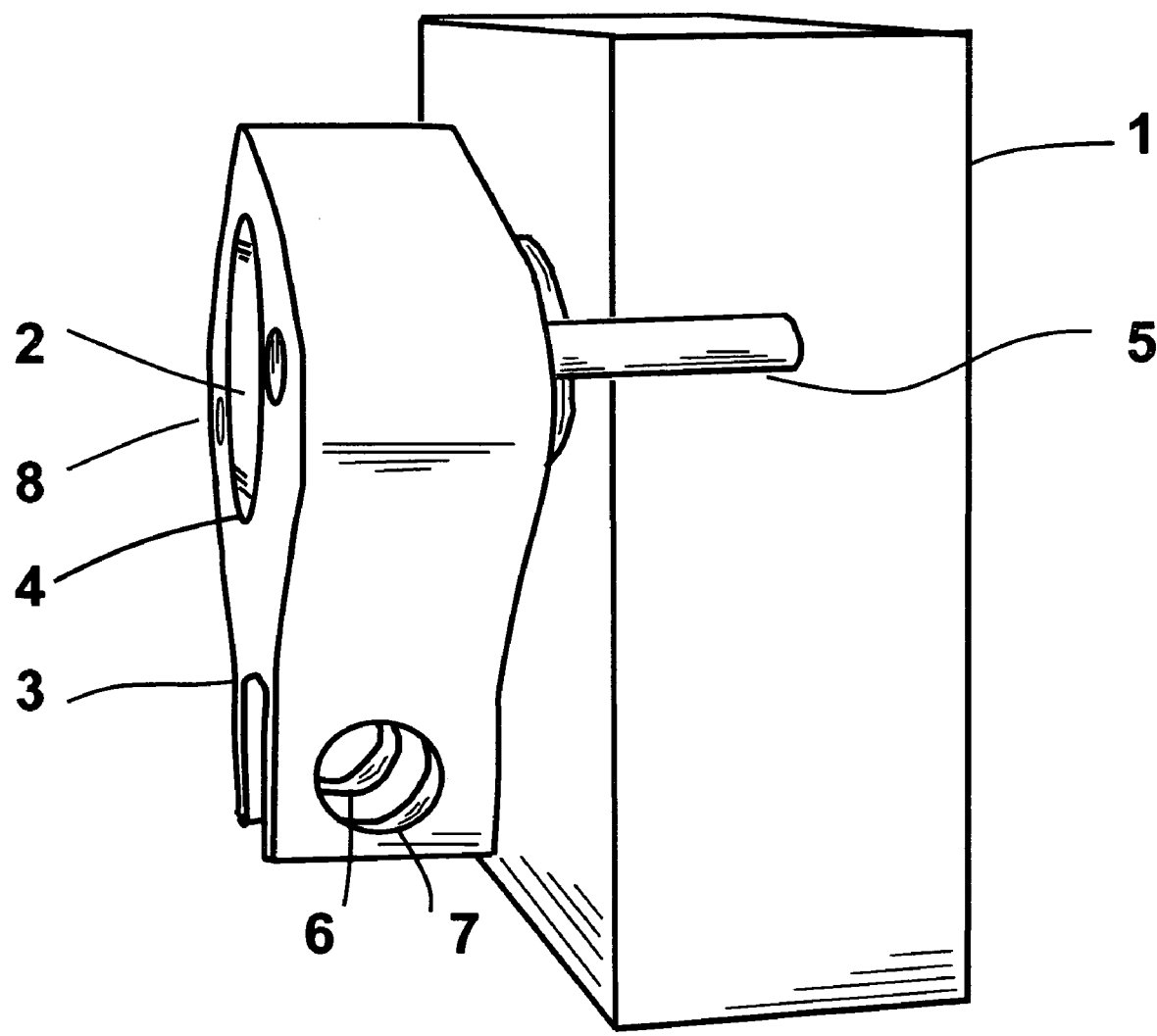
FIG. 4 is a view from the side of the device shown in FIG. 2 connected to a shielding gas flow-control knob illustrating the protrusion that contacts the shielding gas flow-control mechanism or a member connected to that shielding gas flow-control mechanism to limit the range of movement of the flow-control knob.

FIG. 4 is a view from the side of flow rate-limiting knob attachment 3 connected to flow-control mechanism 1. One means of incorporating a mechanical protrusion 5, a pin, is shown permanently affixed to flow rate-limiting knob attachment 3.

OPERATION—MAIN EMBODIMENT

Referring to FIG. 1, flow-control knob 2 is adjusted by turning it clockwise or counter clockwise to the desired shielding gas flow rate passing through flow control mechanism 1. Referring to FIG. 2, mechanical protrusion 5 is physically located in flow rate-limiting knob attachment 3 at a predetermined distance such that when it is attached to flow-control knob 2 it allows some rotational movement of flow-control knob 2 before mechanical protrusion 5 contacts the flow control mechanism 1 body or a part attached to flow control mechanism 1. The system may be adjusted such that there is an ability to make some changes in the flow both increasing and decreasing from the established setting. To accomplish this, flow-control knob 2 is first adjusted to a desired flow. Hole 4 in flow rate-limiting knob attachment 3 is placed over flow-control knob 2 such that mechanical protrusion 5 is positioned a distance from the flow-control mechanism 1 body or a part attached to flow-control mechanism 1 allowing the flow-control knob 2 to be turned both clockwise and counter clockwise. Once flow rate-limiting knob attachment 3 is positioned as described over flow-control knob 2, set screw 9 is tightened to connect the two components.

Referring to FIG. 3, flow rate-control knob 2 may be adjusted such that the flow can only be reduced from an established setting. To accomplish this, first flow-control knob 2 is adjusted to the maximum desired flow setting. Then hole 4 in flow rate-limiting knob attachment 3 is placed over flow-control knob 2 such that mechanical protrusion 5 is positioned in contact with flow-control mechanism 1 body or part attached to flow-control mechanism 1 that prevents flow-control knob 2 from being turned in the direction that would increase flow rate. Once flow rate-limiting knob attachment 3 is positioned over flow-control knob 2 to prevent increases in flow setting, set screw 9 is tightened to connect the two components.

DESCRIPTION AND
OPERATION—ADDITIONAL EMBODIMENTS

Referring to FIG. 5, after set screw 9 is tightened, connecting flow-control knob 2 to flow rate-limiting knob attachment 3, a cover pin 11 is slipped into blocking holes 6 and 7 in flow rate-limiting knob attachment 3. This blocks access to set screw 9 preventing tampering with the settings of flow-control knob 2. Hole 12 goes through the center of cover pin 11. A security-locking device 10 is inserted into hole 12 and locked, preventing pin 11 from being able to be removed from blocking holes 6 and 7. A special tool or key (not shown) may be incorporated to unlock the security-locking device 10. A security coding device (not shown) such as a combination padlock, could also be employed as security-locking device 10. The use of cover pin 11 allows the mechanical security locking device 10 to be much smaller and lighter than the option of inserting mechanical security locking device 10 directly into blocking holes 6 and 7 in flow rate-limiting knob attachment 3. The locking device 10 and pin 11 can be quickly and easily removed to adjust the desire flow range by anyone allowed access.

Figure 6:
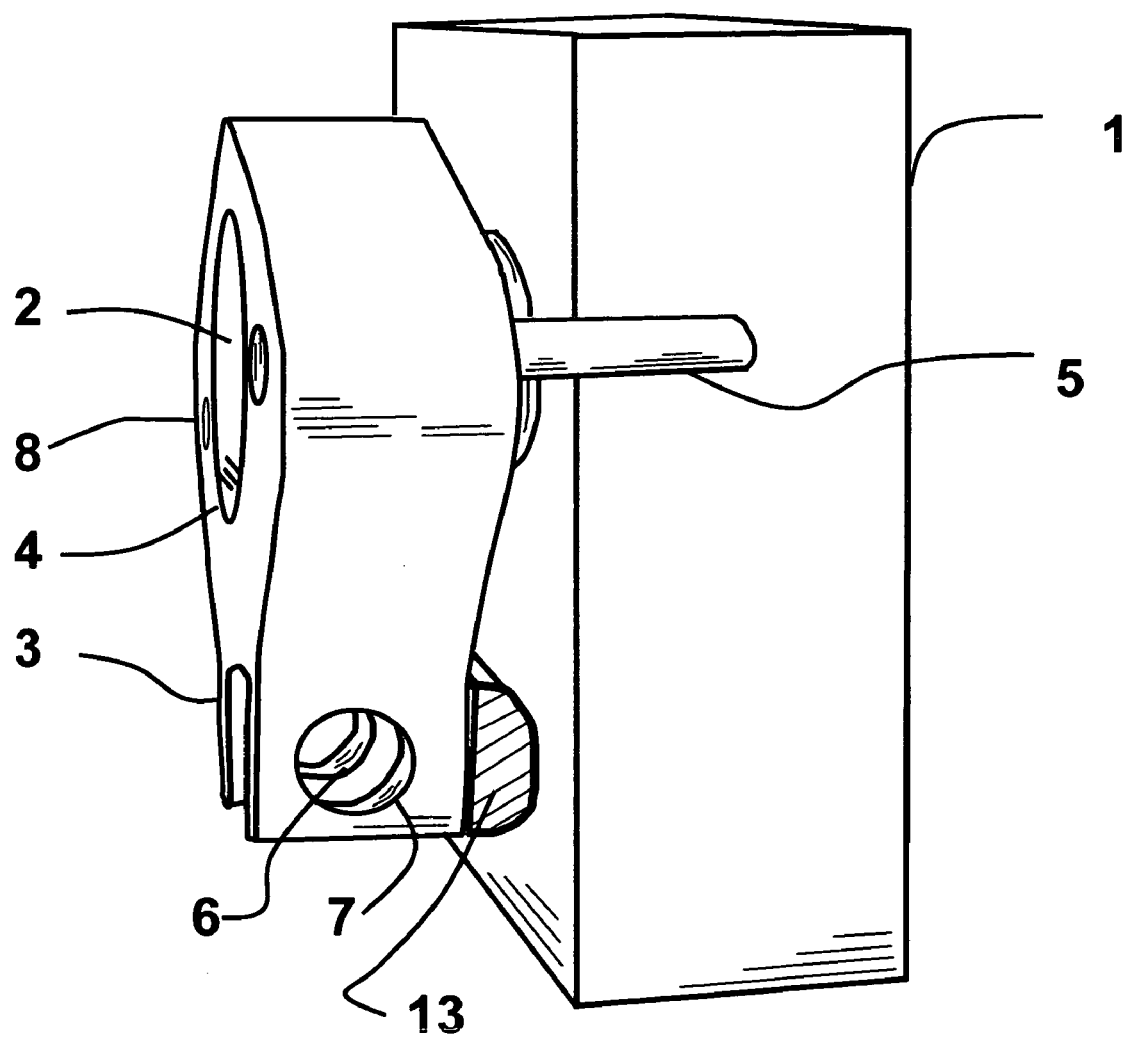
FIG. 6 illustrates the assembly shown in FIG. 3 with the addition of a friction-increasing element to avoid inadvertent changes in the flow setting.

FIG. 6 schematically presents a side view of flow rate-limiting knob attachment 3 connecting flow-control knob 2 with the addition of a friction-increasing device 13. Friction-increasing device 13 is in contact with both flow rate-limiting knob attachment 3 and flow control mechanism 1 body or a part attached to flow control mechanism 1 increasing the force required to rotate flow-control knob 2 and thereby avoiding inadvertent changes in flow. Friction-increasing device 13 requires more force to be used to turn flow-control knob 2. This extra force may be necessary with some flow-control knob 2 devices when flow rate limiting knob attachment 3 is incorporated particularly when the weight of security locking device 10 is present. This friction-increasing device 13 may be a compliant rubber type material that is attached to flow rate-limiting knob attachment 3 or flow-control mechanism 1. Friction-increasing device 13 could also be of a design that includes a spring loaded plunger or similar such means of applying additional friction force to decrease the probability of inadvertent movement of flow-control knob 2.

CONCLUSION, RAMIFICATION, AND SCOPE

The welding shielding gas flow rate-limiting apparatus can be added to existing needle valve type flow-control mechanisms to limit the allowable range of flow setting. The device can be adjusted to establish the maximum allowable flow rate a welding operator may set on a flow-control mechanism. Once installed, it performs a shielding gas waste reduction function by limiting the allowable flow rates to those that are adequate but not excessive. Eliminating the ability to set excessively high flow rates also prevents the creation of turbulent flow exiting the shielding gas nozzle or cup. Eliminating turbulent flow prevents air entrainment into the shielding gas stream improving weld quality. The apparatus can quickly be readjusted to desired different settings by anyone allowed to have access to the required keys or codes. It attaches only to the external parts of the flow-control mechanism and does not require its alteration or disassembly.

I claim:

1. In combination with a welding apparatus using shielding gas, a flow rate limiting apparatus that connects to a flow-control adjustment knob, wherein said flow-control adjustment knob is part of a welding shielding gas control mechanism that regulates a flow of shielding gas wherein, after a desired maximum flow rate is established, said flow rate limiting apparatus is externally connected to said flow-control adjustment knob, and is operable to mechanically limit turning of said flow-control adjustment knob, thereby limiting the maximum flow rate of shielding gas exiting said shielding gas control mechanism while still allowing the flow rate to be lowered from said maximum flow rate.

2. The apparatus of claim 1, wherein a mechanical protrusion is connected to said flow-control adjustment knob and said mechanical protrusion is positioned at a predetermined location to contact said shielding gas control mechanism in such a way as to limit the ability of said flow-control knob to turn in a direction which increases flow and thus limits the flow rate of shielding gas to a desired maximum level but allows said flow-control knob to be turned in a direction that provides a lower flow rate than said maximum level.

3. The apparatus of claim 2, further including a security-locking device that blocks access to a mechanical connecting means used to secure said flow rate-limiting apparatus to said flow-control knob and requiring a special security key type tool or coded lock for removal or loosening of said mechanical connecting means.

4. The apparatus of claim 2, further including a friction-increasing device that raises the force required to turn said flow-control knob reducing the likelihood of inadvertent changes in shielding gas flow occurring, wherein said friction-increasing device may be affixed to said flow rate-limiting apparatus and/or said welding shielding gas control mechanism.

5. The apparatus of claim 3, further including a friction-increasing device that raises the force required to turn said flow-control knob reducing the likelihood of inadvertent changes in shielding gas flow occurring, wherein said friction-increasing device may be affixed to said flow rate-limiting apparatus and/or said welding shielding gas control mechanism.

* * * * *